United States Patent [19]

Marles et al.

[11] 4,164,935
[45] Aug. 21, 1979

[54] SOLAR HEATING PANELS

[75] Inventors: Kevin C. Marles; Brian W. Spencer, both of Torquay, England

[73] Assignee: Solar Apparatus & Equipment Limited, London, England

[21] Appl. No.: 830,997

[22] Filed: Sep. 6, 1977

[30] Foreign Application Priority Data

Oct. 6, 1976 [GB] United Kingdom ............... 41506/76

[51] Int. Cl.² ............................................... F24J 3/02
[52] U.S. Cl. ..................................... 126/447; 165/171
[58] Field of Search ............... 126/270, 271; 237/1 A; 165/171, 172, 182; 29/157.3 C

[56] References Cited

U.S. PATENT DOCUMENTS

| 3,217,797 | 11/1965 | Fitton | 165/171 |
| 3,384,167 | 5/1968 | Javkin | 165/171 |
| 4,052,000 | 10/1977 | Honikman | 126/271 |
| 4,068,653 | 1/1978 | Bourdon et al. | 126/270 |
| 4,080,703 | 3/1978 | Beck, Jr. | 165/171 |
| 4,084,579 | 4/1978 | Yu | 126/271 |

Primary Examiner—James C. Yeung
Attorney, Agent, or Firm—Bacon & Thomas

[57] ABSTRACT

A solar heating panel is constructed from a kit of parts which essentially comprises a number of absorber plate sections, each of which has on one edge an outwardly-facing concave part-cylindrical portion, the concave surface of which has a radius of curvature equal to the radius of curvature of the outside circumferential surface of the tubes which will carry the water to be heated through the panel. In the embodiment described, the part-cylindrical portions on the absorber plate sections are clamped with their concave surfaces in heat-conducting contact with the outer surfaces of the tubes by spring clips which are readily snapped over the convex surfaces of adjacent absorber plate sections. The heat-conducting contact between the concave surfaces on the part-cylindrical portions of the absorber plates and the outer surfaces of the tubes may be either an intimate surface contact between essentially smooth surfaces, or it may be a contact through a film of a heat-conductive paste which ensures a substantial exclusion of air or moisture from between the two curved surfaces.

5 Claims, 6 Drawing Figures

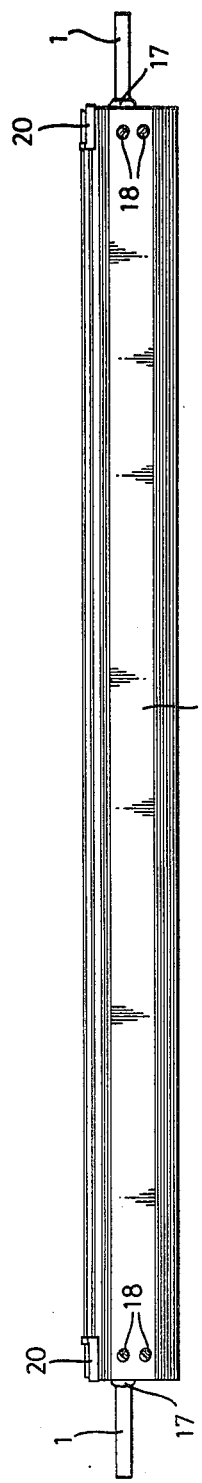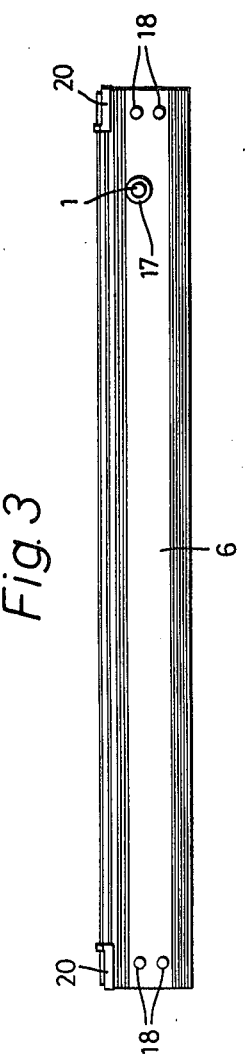
Fig. 2
Fig. 3

SOLAR HEATING PANELS

SUMMARY OF THE INVENTION

This invention relates to solar heating panels.

Solar heating panels are panels which are exposed to receive radiation either directly or indirectly (by diffusion) from the sun and which convert the received radiation into heat which is taken from the panel by a liquid which flows through it. Many types of solar heating panel are already known and in general such solar heating panels are relatively bulky panels which are difficult to transport. It is an object of the present invention to provide a solar heating panel which may be transported as a package of relatively convenient size, and may also be readily assembled on site.

According to the present invention there is provided a solar heating panel which includes a plurality of absorber plate sections each having at one edge an outwardly-facing concave part-cylindrical portion, and the part-cylindrical portions on adjacent absorber plate sections being clamped with their concave surfaces in heat-conducting contact with the outer cylindrical surface of a cylindrical tube for carrying a liquid to be heated.

The heat-conducting contact between the concave surfaces of the part-cylindrical portions and the outer cylindrical surfaces of the associated tubes may be an intimate surface contact between two essentially smooth surfaces. Alternatively, however, the heat-conducting contact may be a contact through a thin film (for example 25 microns in thickness or less) of a heat-conductive paste which is pressed into full contact with the concave surfaces of the part-cylindrical portions and the outer cylindrical surfaces of the associated tubes.

The heat-conducting contact which is provided in accordance with the present invention is a close proximity between the outwardly-facing concave surface of the part-cylindrical portion and the outer cylindrical surface of the tube with a substantial exclusion of moisture, air or any other gas from between the said surfaces. Most advantageously, the exclusion of gas from between the two surfaces is achieved by the presence of the heat-conductive paste which is applied to the two surfaces before these are brought together, surplus heat-conductive paste being squeezed from between the two surfaces as they are clamped together thereby ensuring a substantially total exclusion of gas or moisture which would otherwise have caused a reduction in the flow of heat between the two surfaces over the area occupied by the gas or moisture.

The heat-conductive paste is preferably a compound similar to the heat-transfer compounds (otherwise known as heat sink compounds) which are used for promoting the dissipation of heat from electric circuit components.

In order to achieve the most advantageous arrangement for efficient heat conduction from the absorber plate sections to the cylindrical tubes, the part-cylindrical portions of the plate sections preferably have substantially semi-cylindrical concave surfaces.

More specifically in accordance with the present invention therefore there is provided a solar heating panel comprising a plurality of cylindrical tubes for carrying a liquid to be heated and an absorber plate for absorbing solar radiation falling thereon, the absorber plate including a plurality of plate sections each having at one edge an outwardly-facing concave substantially semi-cylindrical portion, the concave surface of the semi-cylindrical portion having the same radius of curvature as the outer circumferential surface of one of the cylindrical tubes, and spring clip means for engaging the convex outer surfaces of the semi-cylindrical portions on two adjacent plate sections and thereby clamping a cylindrical tube with its outer surface in heat-conducting contact with the concave surfaces of said semi-cylindrical portions.

When it is stated that the plate sections have outwardly-facing concave substantially semi-cylindrical portions it is to be understood that, while the concave surfaces of these portions conform exactly to part of a cylindrical surface, they should extend over a fraction less than half the surface of a cylinder in order that the clamping means may provide a tight fit between the concave surfaces on the absorber plate sections and the outer surfaces of the cylindrical tubes so that good heat-conducting contact is obtained. Nevertheless substantially complete circumferential contact between the concave surfaces of two semi-cylindrical portions and the outer surface of the cylindrical tube is obtained over essentially the whole length of the cylindrical tube embraced by adjacent absorber plate sections.

The plate sections may be provided with part-cylindrical portions, preferably substantially semi-cylindrical portions, on opposed parallel edges of at least the sections which form the central part of the absorber plate. In such a case the absorber plate should either not be mounted in a surrounding frame, or, if mounted in a surrounding frame, the absorber plate should be so positioned within the frame as to allow for both lateral and longitudinal expansion of the absorber plate within the frame.

However, it is preferred that one absorber plate section shall have a part-cylindrical, preferably semi-cylindrical, portion on only one edge, and that an opposite edge of the plate section which is parallel to the said one edge shall face towards the said one edge thereby defining a channel in the plate section within which channel a similar opposite edge of another adjacent plate section is slidingly engaged in a manner which interlocks the said opposite edges but permits expansion of the plate sections relative to one another.

It will be appreciated that, in order that the opposite edges of two plate sections may interlock in sliding engagement with one another, the engaging portions of the opposite edges on the two plate sections must be differently shaped. Accordingly the solar heating panel comprises two kinds of plate section.

Conveniently the adjacent plate sections are clamped in heat-conducting contact with the respective tubes by a plurality of spring clips each of which additionally engages one of a plurality of T-bars extending across that dimension of the panel which is perpendicular to the longitudinal direction of the cylindrical tubes. The securing of the adjacent plate sections to a plurality of T-bars provides for a rigidity in the assembly of the cylindrical tubes and the absorber plate which enables the solar heating panel to be formed without a mounting frame.

However, in the preferred embodiment of the present invention which will be described, the solar heating panel is formed with a surrounding frame to which are secured a plurality of spring plates into which the T-bars are mounted.

A solar heating panel in accordance with the present invention which is capable of being readily assembled on site is particularly suitable for domestic installations for providing space heat and domestic hot water.

Advantageously in a solar heating panel in accordance with the present invention for such domestic use there are provided tubular elbow portions for linking the ends of adjacent cylindrical tubes in such manner that the liquid to be heated is caused to pass successively through all the tubes of the panel.

In accordance with a further aspect of the present invention there is provided a kit of parts for use with cylindrical tubes for erection into a solar heating panel which comprises a plurality of absorber plate sections of similar length and each having on one longitudinal edge an outwardly-facing concave substantially semi-cylindrical portion the concave surface of which has a radius of curvature equal to the radius of curvature of the outer circumferential surface of the said tubes, and each having on the opposite longitudinal edge a channel section constituted by a portion of the plate section which is folded back so that the edge faces the said one edge, and a plurality of spring clips for clamping the semi-cylindrical portions on respective pairs of absorber plate sections with their concave surfaces in heat-conducting contact with the outer cylindrical surfaces of the tubes engaged thereby when a solar heating panel is assembled.

BRIEF DESCRIPTION OF DRAWINGS

The present invention will be better understood from the following detailed description of preferred embodiments thereof which is made, by way of example, with reference to the accompanying drawings, in which FIGS. 2 and 3 are respectively side and end views of the solar heating panel of FIG. 1.

DETAILED DESCRIPTION

Figure 1:
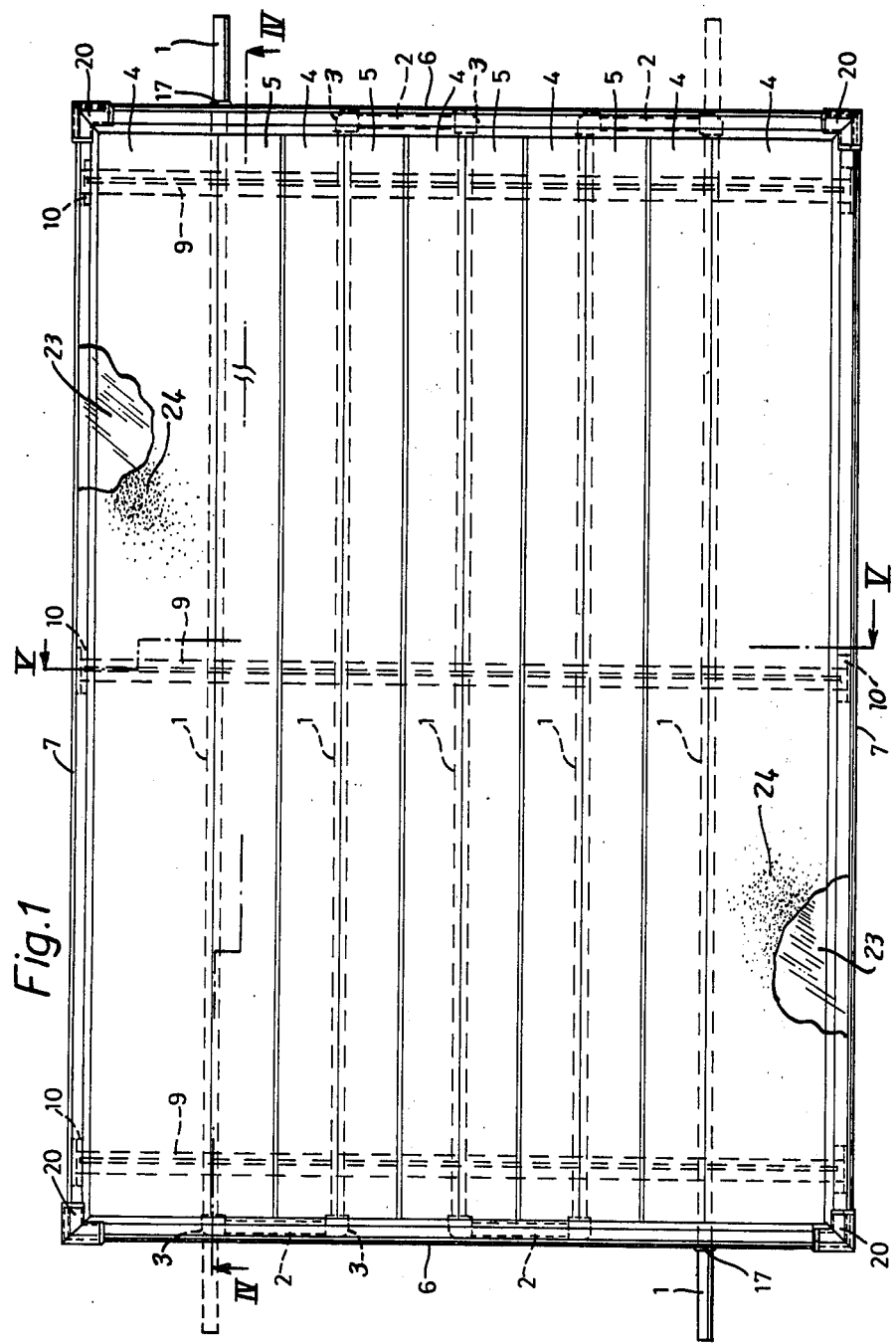
FIG. 1 is a plan view of one embodiment of a solar heating panel in accordance with the present invention.

Referring to FIGS. 1 to 5 of the accompanying drawings there is shown a solar heating panel which includes five cylindrical tubes 1 which may be of any suitable conducting material such as copper, stainless steel, glass or a corrosion resistant aluminum alloy such as that obtainable from Birmetals Ltd. under the name Birmabright BB2. The cylindrical tubes 1 are longitudinally disposed in parallel, as shown in FIG. 1, the upper and lower tubes 1 shown in FIG. 1 extending beyond the periphery of the solar heating panel in order to provide an inlet and an outlet for the liquid (usually water) which is to be heated in the panel. By means of connector tubes 2 which are connected between the ends of adjacent cylindrical tubes 1 by elbows 3, as shown in FIG. 1, water may be circulated successively through all the cylindrical tubes 1 so that it receives a substantial increase in temperature before emerging from the panel. Circulation of water for a substantial time within the panel to maximize heat absorption is particularly desirable in a solar heating panel designed for domestic use.

Figure 5:
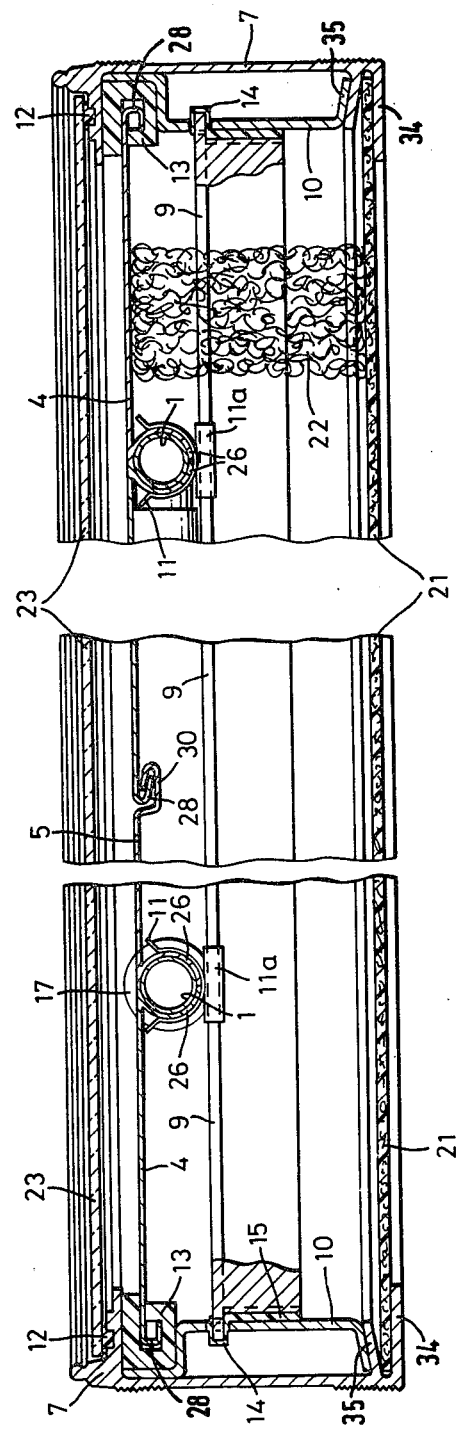
FIG. 5 is a part-lateral section of the solar heating panel of FIG. 1.

The absorber plate in the solar heating panel in accordance with the present invention is comprised of a plurality of absorber plate sections 4 and 5 which are best illustrated in FIG. 5 of the accompanying drawings. The absorber plate sections 4 and 5 are similar to one another in that each has at one edge a substantially semi-cylindrical portion 26. An opposite edge portion 28 of absorber plate section 4 which includes an edge of that plate section which is parallel to the edge of the plate section on the substantially semi-cylindrical portion 26 is shaped by folding back a part of the plate section 4 on itself so that a return lip is provided defining a downwardly facing channel. By contrast the absorber plate section 5 has an opposite edge portion 30 which is shaped so that its edge faces back towards the said one edge on the substantially semi-cylindrical portion 26 in a manner which defines an upwardly facing channel. The channels which are defined by the respective edge portions 28 and 30 are so dimensioned that the absorber plate sections 4 and 5 may be loosely secured to one another by sliding the respective edge portions 28 and 30 into one another. When so engaged the absorber plate sections 4 and 5 are interlocked and cannot be readily separated from one another (other than by sliding them out of engagement), but as illustrated in FIG. 5, a gap between the main bodies of the absorber plate sections 4 and 5 is provided to permit expansion of these absorber plate sections as a result of increase in temperature when exposed to strong solar radiation.

The absorber plate sections 4 and 5 are preferably both made from a sheet (for example 22 gauge) of a corrosion resistant aluminium alloy such as that which is obtainable from Birmetals Ltd. under the name Birmabright BB2. This aluminium alloy contains by weight from 1.7% to 2.4% of magnesium with small quantities of silicon up to a maximum of 0.5%, 0.5% of iron, 0.5% of chromium and manganese together, 0.2% of zinc and 0.1% of copper, the balance which is well in excess of 95% being aluminium. The absorber plate sections 4 and 5 made from such an aluminium alloy sheet are coated with a selective matt black finish 24 on their upper surfaces as indicated in FIG. 1 in order that the absorption of solar radiation by the absorber plate sections 4 and 5 is maximized.

It will be observed from FIG. 5 that the absorber plate sections which are used at the two lateral extremities of the solar heating panel are absorber plate sections 4, that is to say, sections which have the simpler edge portion 28. As illustrated in FIG. 1, the absorber plate sections 4 at the lateral extremities of the solar heating panel have a greater width than the absorber plate sections 4 which alternate with absorber plate sections 5 in the central part of the solar heating panel. However, more advantageously the absorber plate sections 4 at the lateral extremities of the solar heating panel have widths similar to the more centrally located absorber plate sections 4, thereby simplifying the number of members required for assembly of the solar heating panel.

Figure 4:
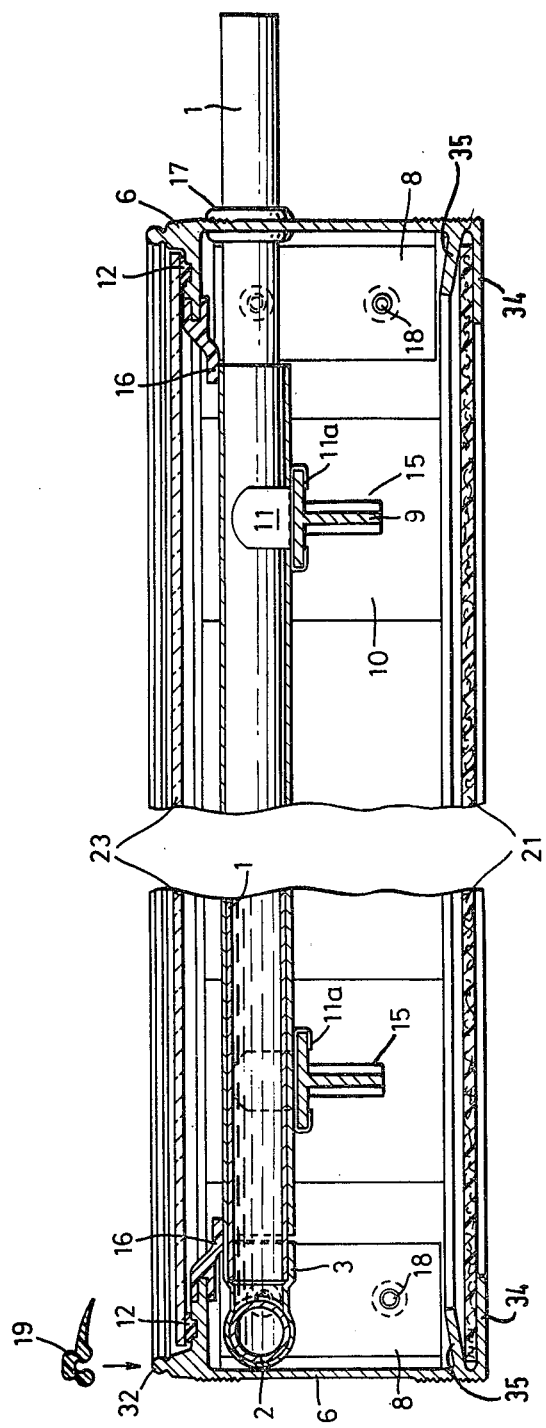
FIG. 4 is a part-longitudinal section of the solar heating panel of FIG. 1.

The solar heating panel which is illustrated in the accompanying drawings is assembled within end frame members 6 and side frame members 7 which are preferably also made of corrosion resistant aluminium alloy and are secured together by angle brackets 8 and screws 18 as shown in FIG. 4 to form a rectangular frame as illustrated in FIG. 1. The end frame members 6 and the side frame members 7 are of similar cross-section as illustrated in FIGS. 4 and 5 respectively.

As shown in FIG. 5 of the accompanying drawings the outwardly-facing concave surfaces of the substantially semi-cylindrical portions 26 on the respective absorber plate sections 4 and 5 engage the outer cylindrical surfaces of the tubes 1. The radius of curvature of the concave surfaces of the portions 26 is the same as the radius of curvature of the outer surface of the cylindrical tube 1 so that a substantially perfect fit between the two surfaces is obtained, and a spring clip 11 is clipped over the portions 26 of the respective absorber plate sections 4 and 5 so as to clamp these portions to the cylindrical tube 1 and thus retain the concave surfaces of the portions 26 and the respective absorber plate sections 4 and 5 in intimate surface contact with the outer cylindrical surface of the tube 1 over substantially the whole of the outer cylindrical tube 1 along the length of the tube which is embraced by the absorber plate sections 4 and 5. In practice there may be a small clearance between the portions 26 on the absorber plate sections 4 and 5 at both the top and the bottom of their engagement with the cylindrical tubes 1 as seen in FIG. 5, but these clearances are kept to a practical minimum in order to maximize heat transfer from the absorber plate sections 4 and 5 to the cylindrical tubes 1 and the water or other liquid passing through the tubes 1.

The spring clips 11 which are effective to form the absorber plate of the solar heating panel of the present invention from the absorber plate sections 4 and 5 by clamping the substantially semi-cylindrical portions 26 of the absorber plate sections into good heat-conducting contact with the outer surfaces of the cylindrical tubes 1, may be simple spring clips 11 which serve the sole function of clamping the portions 26 to the cylindrical tubes 1. However, in the embodiment of the invention which is illustrated in FIGS. 1 to 5 of the drawings, the spring clips 11 are formed integrally with a lower channel portion 11a (see FIG. 4) which enables the spring clips 11 to be slid over the upper horizontal portions of T-bar supports 9. Preferably the spring clips 11 are made from cadmium-plated steel, and the T-bar supports 9 are made of a corrosion resistant aluminium alloy such as the Birmabright BB2.

The T-bar supports 9 are themselves supported by spring plates 10 from which the T-bar supports 9 are insulated by a neoprene seal 14 and a neoprene end piece 15 (see FIGS. 5 and 4 respectively). The spring plates 10 are themselves retained in the side frame members 7 as illustrated in FIGS. 1 and 5. The same spring plates 10 are utilized with neoprene side seals 13 to locate the edge portions 28 of the absorber plate sections 4 at the lateral extremities of the solar heating panel. It will be noted that the neoprene side seal 13 which supports the absorber plate sections 4 in the spring plates 10 is of substantially greater thickness than the other neoprene members for reducing heat loss from the absorber plate to the spring plates 10, and the spring plates 10 themselves occupy only a very small proportion of the length of the side frame members 7 so that the risk of heat conduction from the absorber plate sections 4 to the spring plates 10 and thence to the side frame members 7 is kept to a practical minimum.

Located in dovetailed grooves in the end frame members 6 and the side frame members 7 are strips of neoprene beading 12, upon which is supported a glass sheet 23 which is the top cover of the solar heating panel. The glass sheet 23 is held in position by snap-on plastic beading 19 which, as indicated in FIG. 4, is snapped on to a projection 32 on the top of the frame member. The inwardly projecting part of the plastic beading 19 provides a weather seal to the panel, the junctions between the plastic beadings 19 being themselves protected by plastic corner trims 20 which cover the plastic beadings 19 at the corners. Also a neoprene end seal 16 is secured to the end frame members 6 and engages the end surface portions of the absorber plate sections 4 and 5 in order to cover, and exclude from view, the elbows which join the cylindrical tubes 1 to the connector tubes 2.

The cylindrical tubes 1 which pass through the end frames 6 are located in apertures in the end frames 6 by neoprene grommets 17 (see FIGS. 4 and 5).

Retained within horizontal feet 34, 35 on the end and side frame members 6 and 7 is a backing plate 21 which is advantageously a glass reinforced plastic plate. The backing plate 21 constitutes the effective base of the solar heating panel illustrated in the accompanying drawings and provides support for fiberglass wool insulation 22 which fills all the available space between the absorber plate comprised of the sections 4 and 5, and the backing plate 21.

In the above description of the embodiment of the invention illustrated in FIGS. 1 to 5 of the accompanying drawings it has been stated that the concave surfaces of the substantially semi-cylindrical portions 26 on the respective absorber plate sections 4 and 5 are in intimate surface contact with the outer cylindrical surfaces of the tubes 1 and the intimate surface contact results in good thermal conductivity between the absorber plate sections 4 and 5 to the tubes 1 and the water flowing through the tubes 1. Good thermal conductivity between the substantially semi-cylindrical surfaces of the portions 26 and the tubes 1 may also be obtained by applying to the semi-cylindrical surfaces of the portions 26 and the external surfaces of the tubes 1 a heat-conductive paste which is stable over the range of operating temperatures of the solar heating panel.

The heat-conductive paste is a grease-like material such as a siloxane polymer which includes metal and/or metal oxide in powder form. Siloxane polymers are especially suitable as the basis of a heat-conductive paste which includes a carrier for metals or metal oxides in powder form because siloxane polymers are heat resistant, they will not set unless catalysed and they retain their viscosity over a substantial temperature range. Siloxane polymers retain a stable state up to temperatures as high as 200° C.

A heat-conductive paste which has been found to be suitable for use as a heat-conductive film between the surfaces of an absorber plate and corresponding surfaces on cylindrical tubes to which heat is to be transferred is a siloxane polymer heavily loaded with heat-conductive metal oxides, that is to say, a siloxane polymer containing the maximum quantities of heat-conductive metal oxides, whilst still retaining its essentially viscous state. One heat-conductive paste in accordance with this description is the heat transfer compound sold under the trade name Dow Corning 340.

The application of the heat-conductive paste is made to the outwardly-facing concave surfaces of the substantially semi-cylindrical portions 26 and the outer cylindrical surfaces of the tubes 1 before these surfaces are clamped together using the spring clips 11. The clamping reduces the heat-conductive paste to a thin film of thickness of the order of one to two thousandths of an inch, the surfaces of this film following the contours of the outer concave surfaces on the semi-cylindrical portions 26 and the outer cylindrical surfaces of the tubes 1. There is thus no surface contact between the tubes 1 and the semi-cylindrical portions 26, but the continuous film of the heat-conductive paste provides thermal conductivity as good as is obtained by maintaining the most intimate surface contact between commercially produced smooth surfaces on both the semi-cylindrical portions 26 and the tubes 1. Indeed, by excluding pockets of air from places where there may be irregularities in one or other of the surfaces which are clamped together, the heat-conductive paste provides substantially improved thermal conductivity between the surfaces in such areas.

The presence of a thin film, or barrier, (of the order of 25–50 microns in thickness) of heat-conductive paste between the outer cylindrical surfaces of the tubes 1 and the concave surfaces of the semi-cylindrical portions 26 enables the tubes 1 and the absorber plate sections 4 and 5 to be made of different metals, if desired, without significant deterioration due to electrolysis between different metals in the absorber plate and the tubes occurring. In particular, the presence of the heat-conductive paste enables the tubes 1 to be made of copper, which is highly desirable when the solar heating panel is to be used for hot water systems for domestic or industrial use.

The presence of the heat-conductive paste also facilitates linear expansion of the semi-cylindrical portions 26 relative to the tubes 1 whilst maintaining good heat-conducting contact between the parts. This feature is particularly important when the tubes 1 are made from a different material from that used in the manufacture of the absorber plate sections 4 and 5.

Figure 6:
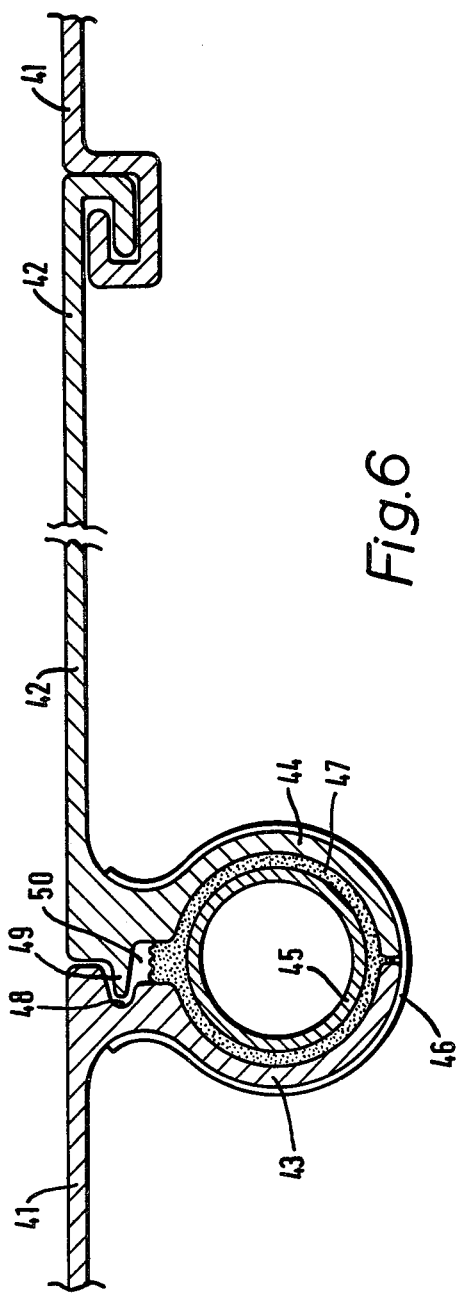
FIG. 6 is a cross-sectional view through a part of another embodiment of a solar heating panel in accordance with the present invention.

FIG. 6 illustrates an alternative embodiment of the invention which is specifically designed for incorporating a heat-conductive paste. The solar heating panel of FIG. 6 has a series of absorber plate sections 41 and 42 which have at their adjacent edges respective outwardly-facing concave substantially semi-cylindrical portions 43 and 44. The plate sections 41 and 42 are assembled so that the concave surfaces of the semi-cylindrical portions 43 and 44 substantially surround a cylindrical tube 45, the outer surface of which has identical curvature to the concave surfaces of the semi-cylindrical portions 43 and 44. The concave surfaces of the semi-cylindrical portions 43 and 44, and the outer surface of the cylindrical tube 45 have a heat-conductive paste applied to them before assembly, and the relationship between the semi-cylindrical portions 43 and 44 and the cylindrical tube 45 is maintained by a series of pressure clips, or spring clips, 46 which are snapped over the outer surfaces of the adjacent members 43 and 44 when these are embracing the outer surface of the tube 45 through the heat-conductive paste which is thereby reduced to a film 47.

The edges of the plate sections 41 and 42 which include the outwardly-facing concave substantially semi-cylindrical portions 43 and 44 respectively, are formed so that a rebate 48 on the edge of the plate section 41 which includes semi-cylindrical portion 43 is engaged by a projecting nib 49 on the edge of plate section 42 adjacent to the semi-cylindrical portion 44. The engagement of the nib 49 in the rebate 48 effectively provides a small chamber 50 into which heat-conductive paste is squeezed from between the engaging surfaces of the semi-cylindrical portions 43 and 44, and the outer surface of the tube 45. The displaced heat-conductive compound is thereby prevented from exuding on the surface of the absorber plate comprised by the plate sections 41 and 42.

The film 47 of heat-conductive paste is maintained under pressure so that the heat-conductive paste is in contact with the whole of the surfaces of the absorber plate sections and the cylindrical tubes, between which thermal conduction of heat is desired in operation of the solar heating panel. In thus providing thorough contact between the heat-conductive paste and the respective surfaces, the paste effectively ensures that there is no moisture or air trapped between the surfaces, and improved thermal conduction of heat from the absorber plate to the tubes is achieved as compared with prior solar heating panels in which tubes are soldered into position in channels in absorber plates.

Conveniently a solar heating panel in accordance with the present invention has dimensions of 1300 mm×900 mm×90 mm, and contains cylindrical tubes of 15 mm external diameter. The solar heating panel has an effective area of 1 sq. meter and it is found that the use of four such panels for a domestic installation having an existing hot water storage capacity of the order of 25 to 35 gallons is competitive in terms of production of thermal energy with an electric immersion heater. Accordingly the use of a system comprising four such panels in accordance with the present invention can effect substantial savings in the use of electrical energy, particularly during the summer months when up to 90% of the daily hot water requirements in the average household may be provided from solar energy.

Although the present invention has been described in conjunction with a solar heating panel having five cylindrical tubes 1, the nature of the panel which is constructed from absorber plate sections 4 and 5 enables panels of different dimensions to be easily assembled from the same basic parts. Indeed, it has been found that a solar heating panel assembled from absorber plate sections 4 and 5 and having three cylindrical tubes 1 is of suitable dimension to fit between the joists in the roof construction of many domestic houses. A solar heating panel may thus be installed in the roof of such a house (without the necessity for encasing the absorber plate sections in side and end frame members) but by simply supporting the assembly of absorber plate sections between the joists (with appropriate thermal insulation) and immediately behind a roof light entered into the roof.

It will be appreciated therefore that a solar heating panel in accordance with the present invention may be extended or reduced in size to meet the desired configuration of absorber plate.

It is envisaged that the solar heating panel in accordance with the present invention will be supplied as a kit of parts in a package of much more convenient size than the assembled panel itself. While this kit of parts may include all the essential parts of the panel in accordance with this invention, viz the absorber plate sections 4 and 5, the cylindrical tubes 1 and the spring clips 11, it is not necessary to include the cylindrical tubes 1 since these will be readily available in standard sizes in any part of the world to which the kit for assembling the panel may be exported. The preferred kit will include the side and end frame members, six absorber plate sections 4 and four absorber plate sections 5 having part-cylindrical portions so made to fit perfectly around a part of the outer circumferential surface of any tube having an outside diameter of either 15 mm or 22 mm or 28 mm, spring clips to snap over the portions of the absorber plate sections which embrace each tube and secure the perfect fit necessary between the absorber plate sections and the heat-conducting cylindrical tubes, fibreglass insulation and the necessary sealing and insulating members, snap-on plastic beading and angle brackets as described with reference to the accompanying drawings. The preferred kit of parts may also include a container containing a supply of heat-conductive paste.

This preferred kit of parts can be supplied in a package measuring only 1400 mm×300 mm×160 mm and weighing about 13 kilos. The kit is capable of being assembled by semi-skilled labour using a local supply of the cylindrical tubes 1, the backing plate 21 and the sheet of glass 23 which constitutes the glazing on the upper surface of the panel.

However, it is also contemplated that the solar heating panel of the present invention may be supplied as a kit of parts containing all the members of the panel as hereinbefore described with reference to the drawings.

It will be appreciated that the essence of the present invention resides in the concept of a solar heating panel, the absorber plate of which is assembled by a method including the steps of taking a first absorber plate section having an outwardly-facing concave part-cylindrical portion at one edge thereof, the concave surface of the part-cylindrical portion having a radius of curvature equal to the radius of curvature of the outer circumferential surface of a tube which in operation of the panel will carry water to be heated, placing the concave surface of the part-cylindrical portion of that absorber plate section in heat-conducting contact with part of the outer cylindrical surface of the tube, taking a second absorber plate section having a similar part-cylindrical portion to the first absorber plate section, placing the concave surface of the part-cylindrical portion of the second absorber plate section in heat-conducting contact with the outer cylindrical surface of the tube so that the part-cylindrical surfaces on the two absorber plate sections substantially surround the outer cylindrical surface of the tube, and then clamping the two part-cylindrical portions of the two absorber plate sections towards one another and against the outer cylindrical surface of the tube so that the heat-conductive contact between the concave surfaces of the two part-cylindrical portions of the absorber plate sections and the outer cylindrical surface of the tube is maintained.

By utilizing absorber plate sections having edge configurations similar to those shown for absorber plate sections 4 and 5 in the accompanying drawings, the absorber plate may be readily made of any desired size simply by using the appropriate number of absorber plate sections and cylindrical tubes. The absorber plate thus made has a built-in ability to accommodate thermal expansion where the edges of adjacent absorber plate sections 4 and 5 are in sliding engagement with one another. Also the absorber plate may be readily utilized with tubes of any material easily and economically because the tubes are retained in position by clamping and without recourse to any expensive jointing techniques.

We claim:

1. A solar heating panel comprising a plurality of cylindrical tubes for carrying a liquid to be heated and an absorber plate for absorbing solar radiation falling thereon, the absorber plate including a plurality of rigid plate sections each having at one edge an outwardly-facing concave substantially semi-cylindrical portion, the concave surface of the semi-cylindrical portion having the same radius of curvature as the outer circumferential surface of one of the cylindrical tubes, and clamping means engaging the convex outer surfaces of the semi-cylindrical portions on two adjacent plate sections and thereby clamping a cylindrical tube with its outer surface in heat-conducting contact with the concave surfaces of said semi-cylindrical portions, each of the plates of said plurality of plate sections being shaped at an opposite edge which is parallel to the said one edge such that the said opposite edge faces towards the said one edge thereby defining a channel in the plate section within which channel a similar opposite edge of another plate section is slidingly engaged in a manner which detachably interlocks the said opposite edges but permits expansion of the plate sections relative to one another.

2. A solar heating panel according to claim 1, wherein said clamping means are spring clip means having spring arms which embrace the convex outer surface of the semi-cylindrical portions with a resilient spring action.

3. A solar heating panel according to claim 2 wherein said spring clip means additionally includes means further comprising a plurality of T-bars extending across that dimension of the panel which is perpendicular to the longitudinal direction of the cylindrical tubes, and engaging one of the T-bars.

4. A solar heating panel according to claim 1 further comprising tubular elbow portions for linking the ends of adjacent cylindrical tubes in such manner that the liquid to be heated is caused to pass successively through all the tubes of the panel.

5. A kit of parts for use with cylindrical tubes for erection into a solar heating panel, which comprises a plurality of rigid absorber plate sections of similar length and each having on one longitudinal edge an outwardly-facing concave substantially semi-cylindrical portion the concave surface of which has a radius of curvature equal to the radius of curvature of the outer circumferential surface of the said tubes, and each having on the opposite longitudinal edge a channel section constituted by a portion of the plate section which is shaped so that the edge faces the said one edge, and a plurality of spring clips for clamping the semi-cylindrical portions on respective pairs of absorber plate sections with their concave surfaces in heat conducting contact with the outer cylindrical surfaces of the tubes engaged thereby when a solar heating panel is assembled, the channel sections being slidingly interengageable in a detachable manner which permits expansion of the plate sections relative to one another both in the direction of the longitudinal edges and in a direction transverse to the longitudinal direction.

* * * * *